United States Patent [19]
Olson

[11] 3,806,036
[45] Apr. 23, 1974

[54] FLUID EMITTER WITH FLOW REVERSAL AT EMITTER GROOVE INLET

[76] Inventor: Donald O. Olson, 5885 Darmouth St., Chula Vista, Calif.

[22] Filed: July 5, 1973

[21] Appl. No.: 376,323

[52] U.S. Cl............... 239/267, 239/542, 239/590, 137/608, 138/44
[51] Int. Cl............................ B05b 1/20, F15d 1/08
[58] Field of Search............... 239/207, 266–269, 239/590, 66, 76, 271, 542; 137/608; 138/43, 44, 42, 45, 46

[56] References Cited
UNITED STATES PATENTS 3,221,996  12/1965  Emmert et al.................. 239/590 X
3,667,685  6/1972  Rinkewich.......................... 239/542
3,693,657  9/1972  Olson................................. 137/608
3,752,505  8/1973  Stout............................. 239/267 X

*Primary Examiner*—Robert S. Ward, Jr.
*Attorney, Agent, or Firm*—Owen, Wickersham & Erickson

[57] ABSTRACT

A fluid emitter of the kind used in irrigation has a flow restricting passageway for providing a small controlled flow of fluid from a conduit. A flow reversal member at the inlet to the restricted passageway prevents suspended foreign matter in the main flow stream from entering and clogging the passageway.

6 Claims, 5 Drawing Figures

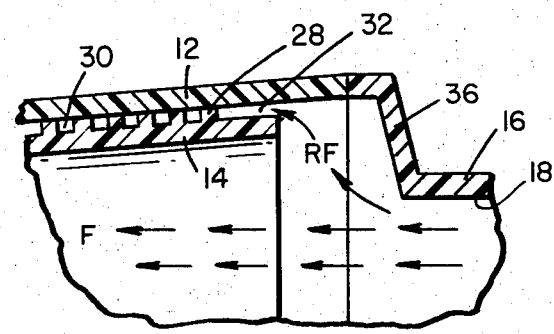
FIG_1 (PRIOR ART)
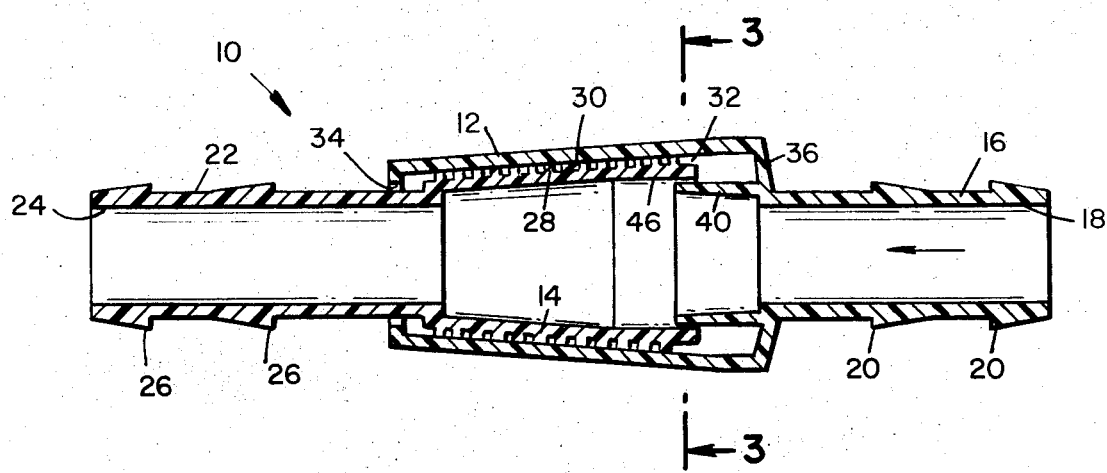
FIG_2
FIG_4
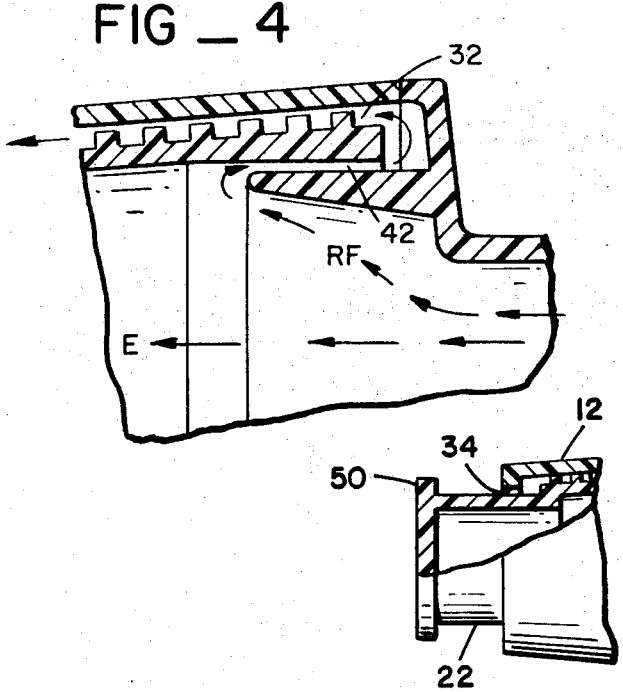
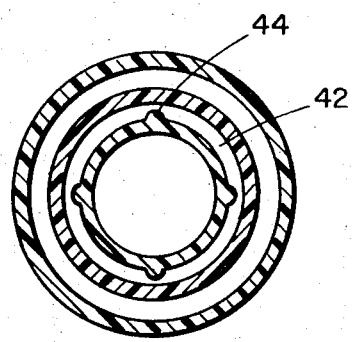
FIG_3
FIG_5

FLUID EMITTER WITH FLOW REVERSAL AT EMITTER GROOVE INLET

BACKGROUND OF THE INVENTION

This invention relates to an irrigation system in which the water or another fluid is discharged at low rates and in a plurality of fixed locations. It relates particularly to a flow restricting fluid emitter for controlling the discharge of fluid at those spots.

This invention is an improvement on the flow restricter with flushing means disclosed in my U.S. application Ser. No. 96,883 filed Dec. 10, 1970 and now U.S. Pat. No. 3,693,657 issued Sept. 26, 1972.

In irrigation systems of the kind to which this invention relates the fluid is conducted through closed pipes. The fluid emitters of the present invention are connected in the pipes at spaced locations to provide a slow, restricted or drip flow of fluid to the area to be irrigated.

To achieve the desired slow rate of fluid discharge from the pipes, each fluid emitter has an elongated, flow restricting channel of quite small cross-sectional area. An inlet for the channel is connected to the relatively large internal bore of the pipe and an outlet opens to the ground outside the emitter. Because the flow restricting channel is so narrow, it can easily be clogged by contaminants, such as rust, dirt and the like. To clear a clogged passageway, the telescoping two piece construction disclosed in my U.S. Pat. No. 3,693,657 noted above was developed. In this construction an inner tubular member and an outer tubular member have a helical groove formed in an annular space between the tubular members, and the tubular members are relatively movable between a flow restricting position and a flushing position. In the flow restricting position, the outer surface of the inner tapered tubular member is positioned very close to the facing surface of the outer tubular member. In this position all of the flow through the annular space must go through the helical passageway. In the flushing position the outer surface of the inner tubular member is in effect retracted from the facing surface of the outer tubular member to provide a relatively wide annular space between the two tubular members. This permits contaminants to be easily flushed out of that space by the increased flow.

While this construction has been quite successful in permitting flushing of a clogged passageway, it does require a mechanical actuation of the mechanism; and a clogged passageway is inoperative until it has been flushed.

SUMMARY OF THE INVENTION

It is a primary object of the present invention to overcome the drawbacks of the prior art devices by preventing contaminants from the main flow stream from entering the flow restricting passageway.

It is a closely related object to retain the benefits of the telescoping construction which permits flushing as disclosed in my U.S. Pat. No. 3,693,657 described immediately above while preventing clogging material such as relatively large sand particles from entering into the flow restricting passageway.

The fluid emitter of the present invention comprises tapered, telescoping, tubular members which are axially movable to provide the flushing action disclosed in my U.S. Pat. No. 3,696,657. The present invention also provides a flow reversal means at the inlet to the restricted passageway which requires the fluid entering the restricted passageway to reverse direction 180° from the direction of main flow through the irrigation pipe and the inner bore of the fluid emitter. The flow entering the restricted passageway must also pass through a relatively narrow width channel and in a direction reversed to the direction of main fluid flow before this fluid can get into the restricted flow passageway. This virtually eliminates the entry of clogging particles from the main fluid flow stream into the flow restricting passageway. The particles tend to sweep past the flow reversal means and to continue in the main body of fluid flow rather than to reverse direction and to flow through the narrow passageway leading to the inlet to the flow restricting passageway.

In a specific form of the present invention the flow reversal is accomplished by an axially extending circular flange formed integrally at one end with the outer tubular members and having an inner, downstream end projecting within and closely spaced from the upstream end of the inner tubular member.

Fluid emitter apparatus and methods which incorporate the structure and techniques described above and which are effective to function as described above constitute specific objects of this invention.

Other objects, advantages and features of my invention will become apparent from the following detailed description taken with the accompanying drawings.

BRIEF DESCRIPTION OF THE DRAWINGS

FIG. 1 is a fragmentary elevation view in cross-section of a fluid emitter like that disclosed in my U.S. Pat. No. 3,693,657 noted above and shows how contaminants from the main flow stream can enter into the flow restricting passageway;

FIG. 2 is an elevation view in cross-section of a fluid emitter constructed in accordance with an embodiment of the present invention;

FIG. 3 is an elevation view taken along the line and in the direction indicated by the arrows 3—3 in FIG. 2;

FIG. 4 is an enlarged fragmentary view of the portion of the structure in FIG. 2 showing the fluid emitter in the flushing position; and FIG. 5 is a view like FIG. 2 showing an embodiment in which one tubular member is capped off.

DESCRIPTION OF A PREFERRED EMBODIMENT

A fluid emitter constructed in accordance with one embodiment of the present invention is indicated generally by the reference numeral 10 in FIG. 2.

The emitter 10 comprises an outer tubular member 12 and an inner tubular member 14. Both members have a slight conical taper as illustrated. In a specific embodiment of the present invention this taper is at an angle of 4° from the longitudinal axis.

The outer member 12 serves as a sleeve, and the inner member 14 serves as a spool which is axially shiftable to a limited extent within the sleeve between the flow restricting position illustrated in FIG. 2 and a flushing position (FIG. 4) in which the inner member 14 is moved to the right, as viewed in FIG. 2, to increase the space between the inner and outer members for flushing as will be described in greater detail below.

The outer member 12 has a generally cylindrically extending end extention 16. The end extention 16 has a large diameter inner bore 18 and a series of barbs 20 on the outer surface. This extention 16 is inserted within a pipe or conduit, and the barbs 20 then hold the end extention 16 in place.

Similarly, the inner member 14 has an end extention 22 formed with a large diameter inner bore 24 and a plurality of barbs 26 for connection to a pipe or conduit.

Water flows through the emitter 10 from the right-hand end to the left-hand end in the direction of the arrows F as illustrated in FIGS. 2 and 4.

Both the outer member 12 and inner member 14 are molded from polypropelene plastic in a specific form of the present invention.

The outer surface of the inner spool 14 is formed with a helically extending thread 28 which provides a corresponding helically extending flow passageway 30 of extended length and restricted cross-sectional area between the outer surface of the spool 14 and the inner surface of the sleeve 12. This passageway 30 has an entrance 32 at the upstream end, or right-hand end as viewed in FIG. 2, of the inner spool 14.

The downstream end of the outer sleeve 12 has an opening 34 which is somewhat larger in diameter than the outside of the end extention 22 of the inner spool, and this provides an outlet for the flow restricting passageway 30. When the inner spool is positioned as illustrated in FIG. 2 the outer surfaces of the threads 28 engage the inner surface of the sleeve 12 so that all flow must go through the passageway 30 between the helical thread.

As illustrated in FIG. 2, the upstream end of the spool 14, in flow restricting position described immediately above, is spaced from a generally radially extending flange 36 which connects the sleeve 12 with the end extention 16. The spool 14 can therefore be shifted axially, to the right as viewed in FIG. 2, in a telescoping type of movement; and the conical tapers of the inner and outer members 12 and 14 cause the annular space between the two members to be substantially increased by this motion. This in turn permits increased flow to go through the annular space to flush out any materials that might have clogged the narrow helical passageway 30.

After the clogging material has been flushed out, the parts are returned to the position illustrated in FIG. 2.

As thus far described, the emitter 10 shown in FIG. 2 is similar in structure and function to the emitter disclosed in my U.S. Pat. No. 3,693,657. For cenvenience in reference, a portion of the relevant structure of the emitter disclosed in my U.S. Pat. No. 3,693,657 has been illustrated in FIG. 1 and indicated as prior art. The same reference numerals have been applied to this FIG. 1 structure as to the structure of the present invention thus far described and illustrated in FIG. 2.

One of the drawbacks of the structure shown in FIG. 1 was the relative ease with which clogging materials could flow from the main flow stream F into the flow restricting passageway 30. Thus, as illustrated by the arrows RF indicating the flow stream of fluid entering the entrance 32 to the flow restricting passageway 30, the restricted flow stream had pretty much a direct line of flow into the entrance 32 with the FIG. 1 construction. Rust, dirt, sediment and other foreign matter suspended in the main flow stream therefore had relatively easy access to the flow restricting passageway 30. While the spool 14 could be shifted to flush out such foreign matter, still the emitter could be completely or partially inoperative until such clogging material was flushed out.

The present invention includes flow reversal means for preventing such suspended foreign matter in the main flow stream F from entering the flow restricting passageway 30.

These flow restricting means include an axially extending circular flange 40 which projects downstream from the radial flange 36 and is disposed within the upstream end of the spool 14 in overlapping relationship as illustrated in FIG. 2. The outer diameter of the flange 40 is slightly less than the inside diameter of this end of the spool 14 to provide an annular passageway 42 (see FIG. 3). Thus, the flow RF of the fluid going into the flow restricting passageway 30 must reverse itself by 180 degrees from the direction of flow of the main flowstream F before it can pass through the passageway 32 and enter the flow restricting passageway 30 through the entrance 32. The momentum of the suspended foreign matter and the force of the current in the main flow stream F therefore tend to carry all of the foreign matter past the downstream lip or end of the flange 40, and this has proved quite effective in virtually eliminating problems of clogging of the flow restricting passageway 30.

As best illustrated in FIG. 3, the flange 40 is preferably formed with a series of circumferentially spaced and radially extending ribs 44.

The inner surface of the spool 18 is also preferably formed with a cylindrical section 46 which is just slightly larger in internal diameter than the outside diameter of the ribs 44 so that these ribs 44 can serve as guides for this end of the spool 14 when the spool is shifted within the outer sleeve 12 for any flushing that might be required.

As shown in FIG. 5, the tubular member 14 may have an end cap 50 formed on the end of the extention 22.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A flow restricting fluid emitter of the kind used in irrigation, said emitter comprising, an outer tubular member, an inner tubular member extending axially within the outer tubular member and having a relatively large diameter inner bore, flow restrictor means providing a flow restricting passageway for fluid flow between the outer and inner members, an inlet for the passageway adjacent one end of the inner member and an outlet for the passageway extending through the outer member, and flow reversal means associated with said inlet for preventing the entrance of suspended foreign matter from the fluid in the bore to the fluid in said flow restricting passageway.

2. The invention defined in claim 1 wherein the flow reversal means include an axially extending circular flange which overlaps said inlet.

3. The invention defined in claim 2 wherein the flange is formed integrally at the upstream end with the outer tubular member and the downstream end of the flange extends axially into the bore in said one end of the inner member.

4. The invention defined in claim 3 wherein the outer surface of the flange is spaced radially inwardly from the inner surface of the inner member to form a narrow width annular flow channel.

5. The invention defined in claim 4 wherein the outer and inner tubular members are conically tapered with the larger diameter ends upstream and the smaller diameter ends downstream in the direction of fluid flow through the bore in the inner tubular member and wherein the inner tubular member is axially movable to a limited extent in the upstream direction of flow with respect to the outer tubular member to increase the radial space between the tubular members for flushing of said flow restricting passageway.

6. The invention defined in claim 5 including a plurality of circumferentially spaced radially extending ribs on the outer surface of the flange and wherein the inner surface of the inner tubular member at the upstream end has a cylindrical configuration which permits that end of the tubular member to ride on said ribs during said axial movement of the inner member with respect to the outer member.

* * * * *

UNITED STATES PATENT OFFICE
CERTIFICATE OF CORRECTION

Patent No. 3,806,036   Dated April 23, 1974

Inventor(s) Donald O. Olson

It is certified that error appears in the above-identified patent and that said Letters Patent are hereby corrected as shown below:

Column 1, line 68, "3,696,657" should read -- 3,693, 657 --;
Column 2, line 20, "members" should read -- member --;
Column 4, line 11, "flow restricting means" should read -- flow reversal means --; In Figure 4 of the drawing "E" should be changed to -- F --.

Signed and sealed this 12th day of November 1974.

(SEAL)
Attest:

McCOY M. GIBSON JR.
Attesting Officer

C. MARSHALL DANN
Commissioner of Patents